(12) United States Patent
Wu et al.

(10) Patent No.: US 9,066,027 B2
(45) Date of Patent: Jun. 23, 2015

(54) PICTURE DELIVERING SYSTEM BASED ON VISUAL CRYPTOGRAPHY AND RELATED COMPUTER PROGRAM PRODUCT

(71) Applicant: JRSYS International Corp., Taipei (TW)

(72) Inventors: Jiann Dong Wu, Taipei (TW); Tai-Hung Lin, Taipei (TW); Jia-Hong Chen, Taipei (TW)

(73) Assignee: JRSYS INTERNATIONAL CORP., Taipei (TW)

( * ) Notice: Subject to any disclaimer, the term of this patent is extended or adjusted under 35 U.S.C. 154(b) by 94 days.

(21) Appl. No.: 14/010,136

(22) Filed: Aug. 26, 2013

(65) Prior Publication Data
US 2014/0177836 A1 Jun. 26, 2014

(30) Foreign Application Priority Data
Nov. 9, 2012 (TW) .............................. 101141716 A

(51) Int. Cl.
| H04N 1/44 | (2006.01) |
| H04N 1/32 | (2006.01) |
| G09C 5/00 | (2006.01) |
| G06F 21/60 | (2013.01) |

(52) U.S. Cl.
CPC ............ *H04N 1/32272* (2013.01); *H04N 1/448* (2013.01); *G06F 21/608* (2013.01); *G09C 5/00* (2013.01); *H04N 2201/3226* (2013.01)

(58) Field of Classification Search
None
See application file for complete search history.

(56) References Cited

U.S. PATENT DOCUMENTS

| 5,321,749 A * | 6/1994 | Virga ............................. 380/243 |
| 2004/0148410 A1* | 7/2004 | Howard et al. ................ 709/229 |
| 2010/0111301 A1* | 5/2010 | Wanderley .................... 380/243 |

FOREIGN PATENT DOCUMENTS

| CN | 101520885 A | 9/2009 |
| TW | 200934568 A | 8/2009 |
| TW | 200952439 A1 | 12/2009 |
| TW | 201243643 A1 | 11/2012 |

* cited by examiner

*Primary Examiner* — Fatoumata Traore
(74) *Attorney, Agent, or Firm* — Birch, Stewart, Kolasch & Birch, LLP

(57) ABSTRACT

A picture delivering system is disclosed including: a picture generating device for outputting a flat picture corresponding to an encrypted picture and for providing a picture ID corresponding to the encrypted picture; and a picture presenting device for utilizing an optical imaging device to capture an image of the flat picture to generate a captured picture, for obtaining the picture ID, and for transmitting the picture ID to the picture generating device. When the picture presenting device passed an entity identification procedure, the picture presenting device obtains a decryption information, processes the captured picture according to the decryption information to obtain a decrypted picture, and then utilizes a display device to display the decrypted picture. The decryption information comprises at least one of a seed key, a mask picture, and a transposition table corresponding to the picture ID.

30 Claims, 8 Drawing Sheets

PICTURE DELIVERING SYSTEM BASED ON VISUAL CRYPTOGRAPHY AND RELATED COMPUTER PROGRAM PRODUCT

CROSS-REFERENCE TO RELATED APPLICATIONS

This application claims the benefit of priority to Patent Application No. 101141716, filed in Taiwan on Nov. 9, 2012; the entirety of which is incorporated herein by reference for all purposes.

BACKGROUND

The disclosure generally relates to a picture delivering system and, more particularly, to a picture delivering system based on visual cryptography and related computer program product.

As the demand for paperless environment increases, many applications for transmitting data via internet or electrical approaches have been developed to facilitate the transmission of picture data. For various private or confidential picture data, however, the internet and conventional electrical transmission approaches still have data security problems. This is not only obstructive to the development of paperless applications, but also results in a bottleneck of promoting the paperless applications.

SUMMARY

In view of the foregoing, it can be appreciated that a substantial need exists for a picture delivering system that can increase the security and convenience in the transmission of picture data.

An example embodiment of a picture delivering system based on visual cryptography is disclosed, comprising: a viewing control server; a picture generating device, configured to operably output a flat picture corresponding to an encrypted picture, to operably provide a picture ID corresponding to the encrypted picture, and to operably transmit the picture ID, or a seed key, a mask picture, or a transposition table corresponding to the picture ID to the viewing control server; and a picture presenting device, configured to operably utilize an optical imaging device to capture an image of the flat picture to generate a captured picture, to operably obtain the picture ID, and to operably transmit the picture ID to the viewing control server via internet; wherein the viewing control server conducts an entity identification procedure with the picture presenting device, and when the picture presenting device passed the entity identification procedure, the picture presenting device obtains a decryption information, processes the captured picture according to the decryption information to obtain a decrypted picture, and then utilizes a display device to display the decrypted picture; wherein the decryption information comprises at least one of the seed key, the mask picture, and the transposition table.

Another example embodiment of a picture delivering system based on visual cryptography is disclosed, comprising: a picture generating device, configured to operably output a flat picture corresponding to an encrypted picture and to operably provide a picture ID corresponding to the encrypted picture; and a picture presenting device, configured to operably utilize an optical imaging device to capture an image of the flat picture to generate a captured picture, to operably obtain the picture ID, and to operably transmit the picture ID to the picture generating device via internet; wherein the picture generating device conducts an entity identification procedure with the picture presenting device, and when the picture presenting device passed the entity identification procedure, the picture presenting device obtains a decryption information, processes the captured picture according to the decryption information to obtain a decrypted picture, and then utilizes a display device to display the decrypted picture; wherein the decryption information comprises at least one of a seed key, a mask picture, and a transposition table corresponding to the picture ID.

An example embodiment of a computer program product is disclosed. The computer program product is stored in a non-transitory computer readable medium. When the computer program product is executed by a processor module of a picture presenting device, the computer program product enables the picture presenting device to perform a picture viewing operation, wherein the picture presenting device comprises the processor module, a display device, a communication device, and an optical imaging device. The picture viewing operations comprises: utilizing the optical imaging device to capture an image of a flat picture to generate a captured picture; obtaining a picture ID corresponding to an encrypted picture; utilizing the communication device to transmit the picture ID to a viewing control server via internet; conducting an entity identification procedure with the viewing control server and obtaining a decryption information when passed the entity identification procedure, wherein the decryption information comprises at least one of a seed key, a mask picture, and a transposition table corresponding to the picture ID; utilizing the processor module to process the captured picture according to the decryption information to obtain a decrypted picture; and utilizing the display device to display the decrypted picture.

One advantage of the above embodiments is that the proposed approach greatly facilitates the applications for mass publishing of private or confidential picture data.

With the proposed picture delivering system, viewing control mechanism with respect the picture data could be easily achieved, thereby increasing the security and convenience in the transmission of private or confidential picture data.

In addition, the picture presenting device is allowed to generate the decrypted picture only if the picture presenting device is installed with a valid picture viewer module. Such mechanism provides additional security to the viewing control of the private or confidential picture data. Accordingly, the proposed picture delivering system and related computer program products create great benefit for the development and promotion of paperless applications.

It is to be understood that both the foregoing general description and the following detailed description are example and explanatory only and are not restrictive of the invention, as claimed.

DETAILED DESCRIPTION

Reference is made in detail to embodiments of the invention, which are illustrated in the accompanying drawings.

Figure 1:
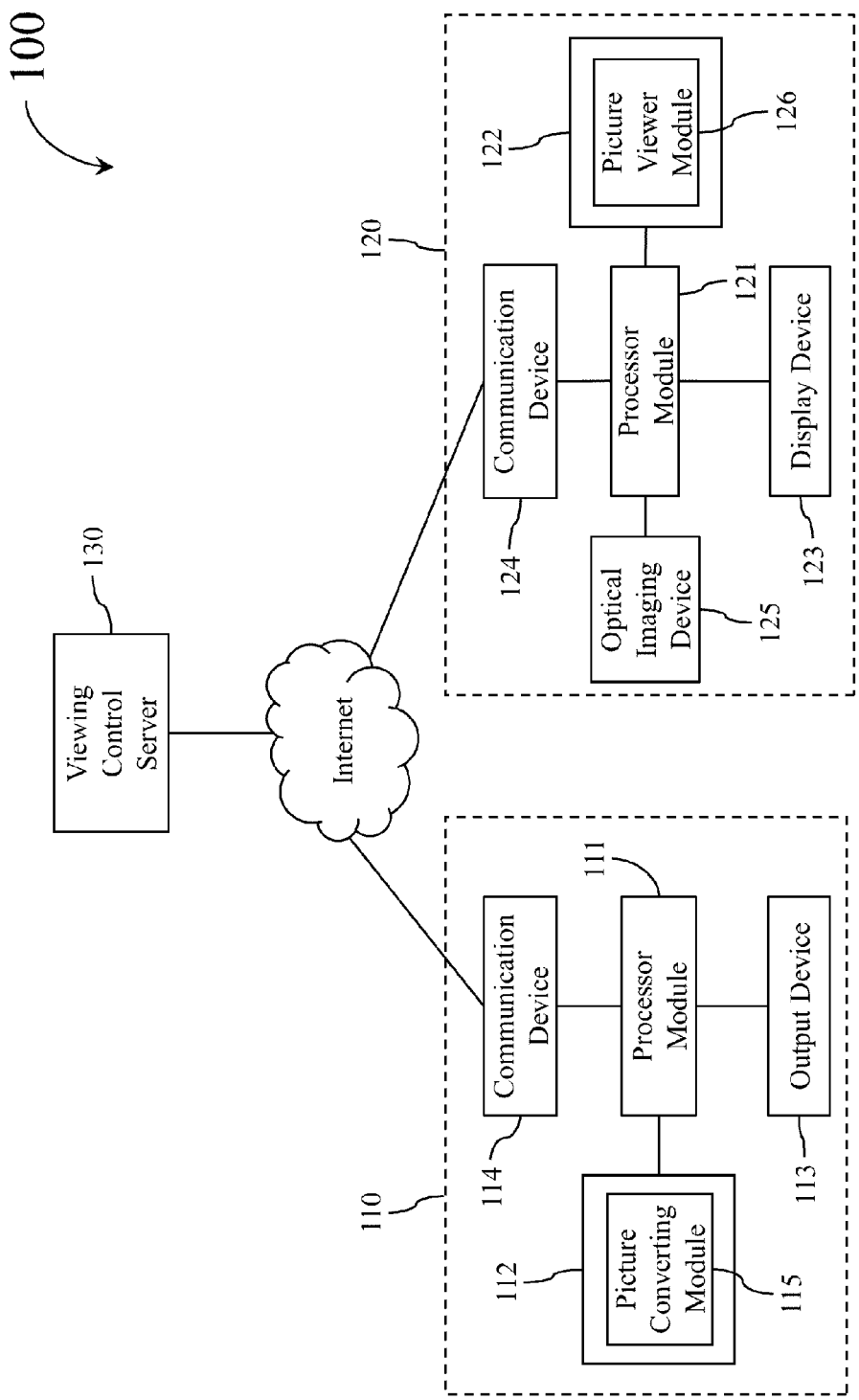
FIG. 1 shows a simplified functional block diagram of a picture delivering system based on visual cryptography according to one embodiment of the present disclosure.

Please refer to FIG. 1, which shows a simplified functional block diagram of a picture delivering system 100 based on visual cryptography according to one embodiment of the present disclosure. The picture delivering system 100 comprises a picture generating device 110, a picture presenting device 120, and a viewing control server 130.

In this embodiment, the picture generating device 110 and the picture presenting device 120 communicate with the viewing control server 130 via internet. A user of the picture generating device 110 may utilize the picture generating device 110 to deliver private or confidential picture data (such as a payroll, various passwords, private images, confidential documents, or the like) to a user of the picture presenting device 120.

As shown in FIG. 1, the picture generating device 110 comprises a processor module 111, a storage device 112, an output device 113, a communication device 114, and a picture converting module 115, wherein the picture converting module 115 is stored in the storage device 112. The picture presenting device 120 comprises a processor module 121, a storage device 122, a display device 123, a communication device 124, an optical imaging device 125, and a picture viewer module 126, wherein the picture viewer module 126 is store in the storage device 122.

Each of the processor module 111 and the processor module 121 may be realized with one or more processor units, and each of the storage devices 112 and 122 may be realized with a volatile memory or a non-volatile memory. In addition, each of the communication devices 114 and 124 may be a wired networking device, a wireless networking device, or a hybrid circuit integrated with the functionalities of the above two networking devices. In this embodiment, each of the picture converting module 115 and the picture viewer module 126 is a functional module realized with one or more application programs. For the purpose of explanatory convenience in the following description, other components and related connections in the picture generating device 110 and the picture presenting device 120 are not shown in FIG. 1.

The picture generating device 110 may be various device having computing capability and capable of displaying or printing pictures (or capable of controlling an external display to display picture or controlling an external printer to print pictures). For example, the picture generating device 110 may be a desktop computer, a tablet computer, a notebook computer, a point of sale (POS) device, a cashier machine, a smart phone, or the like. Alternatively, the picture generating device 110 may be a combination of a printing apparatus and any of the above devices. The picture presenting device 120 may be various portable device having optical imaging functionality, such as a mobile phone, a notebook computer, a tablet computer, a netbook computer, an E-book, a hand-held game console, or the like. The optical imaging device 125 may be realized with any known device capable of optically capturing images of any object, such as a camera installed on the picture presenting device 120.

In practice, the viewing control server 130 may be realized with a single server, multiple servers located in the same geographic region, or multiple servers located in different geographic regions.

The operations of the picture delivering system 100 will be further described in the following with reference to FIG. 2 through FIG. 6.

Figure 2:
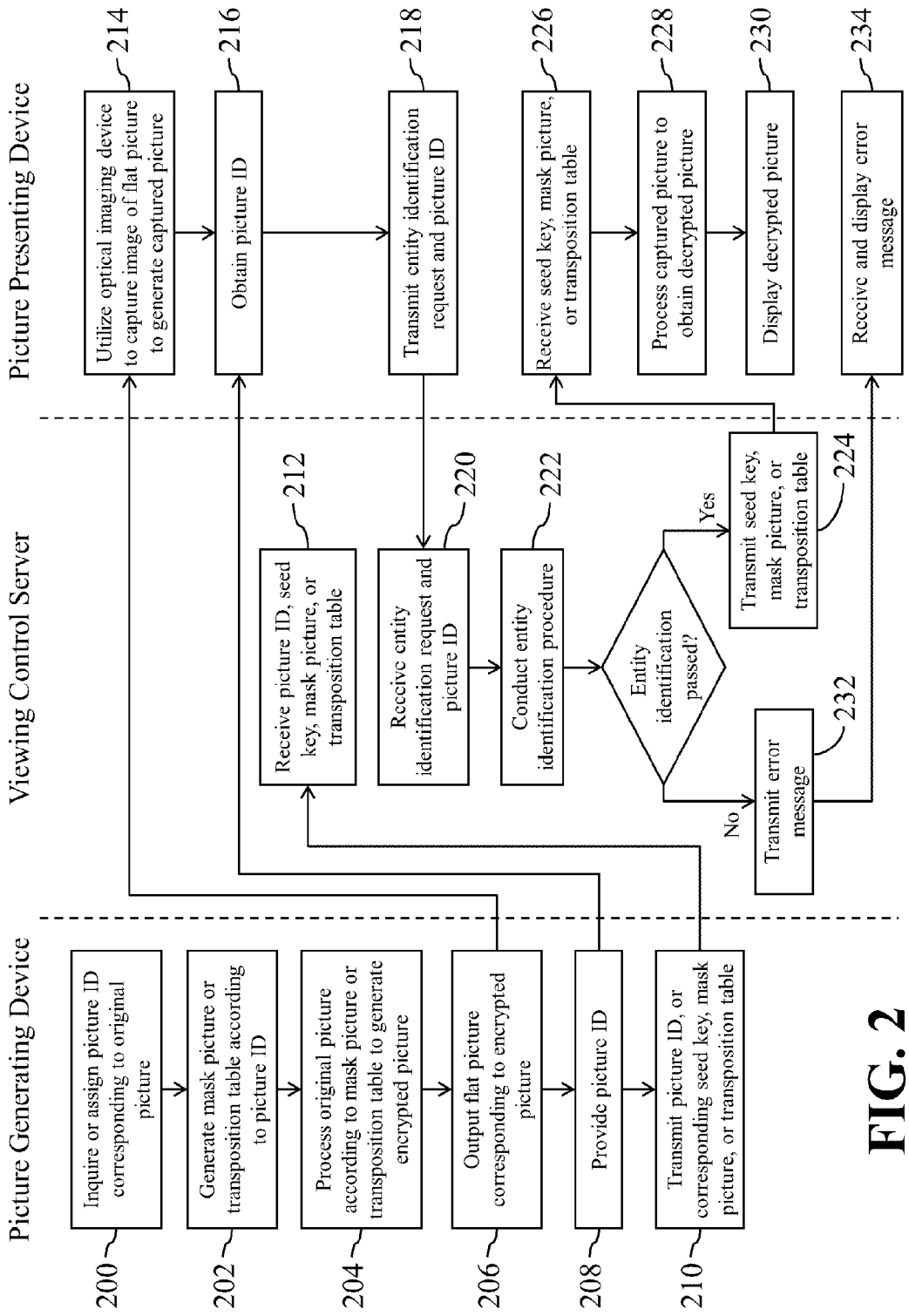
FIG. 2 shows a simplified flowchart illustrating a picture delivering method according to a first embodiment of the present disclosure.

FIG. 2 shows a simplified flowchart illustrating a picture delivering method based on visual cryptography according to a first embodiment of the present disclosure.

In FIG. 2, the left column represents operations to be performed by the picture generating device 110; the right column represents operations to be performed by the picture presenting device 120; and the middle column represents operations to be performed by the viewing control server 130. When the picture delivering system 100 performs the picture delivering method illustrated in FIG. 2, the processor module 111 of the picture generating device 110 executes the picture converting module 115 to enable the picture generating device 110 to perform some or all operations within the left column of FIG. 2, and the processor module 121 of the picture presenting device 120 executes the picture viewer module 126 to enable the picture presenting device 120 to perform some or all operations within the right column of FIG. 2.

In the picture delivering system 100, each picture that the picture generating device 110 want to deliver to the picture presenting device 120 has a unique picture ID. That is, different pictures have different picture IDs. Accordingly, when the picture generating device 110 wants to deliver a specific original picture to the picture presenting device 120, the processor module 111 of the picture generating device 110 performs an operation 200 to inquire a picture ID corresponding to the specific original picture from a database, or to assign a corresponding picture ID for the specific original picture.

In an operation, the processor module 111 of the picture generating device 110 generates a mask picture or a transposition table corresponding to the picture ID of the original picture.

In an operation, the processor module 111 utilizes a visual cryptography algorithm to process the original picture according to at least one of the mask picture and the transposition table to generate an encrypted picture.

The operations 202 and 204 performed by the picture generating device 110 will be further described below with reference to FIG. 3 and FIG. 4.

Figure 3:
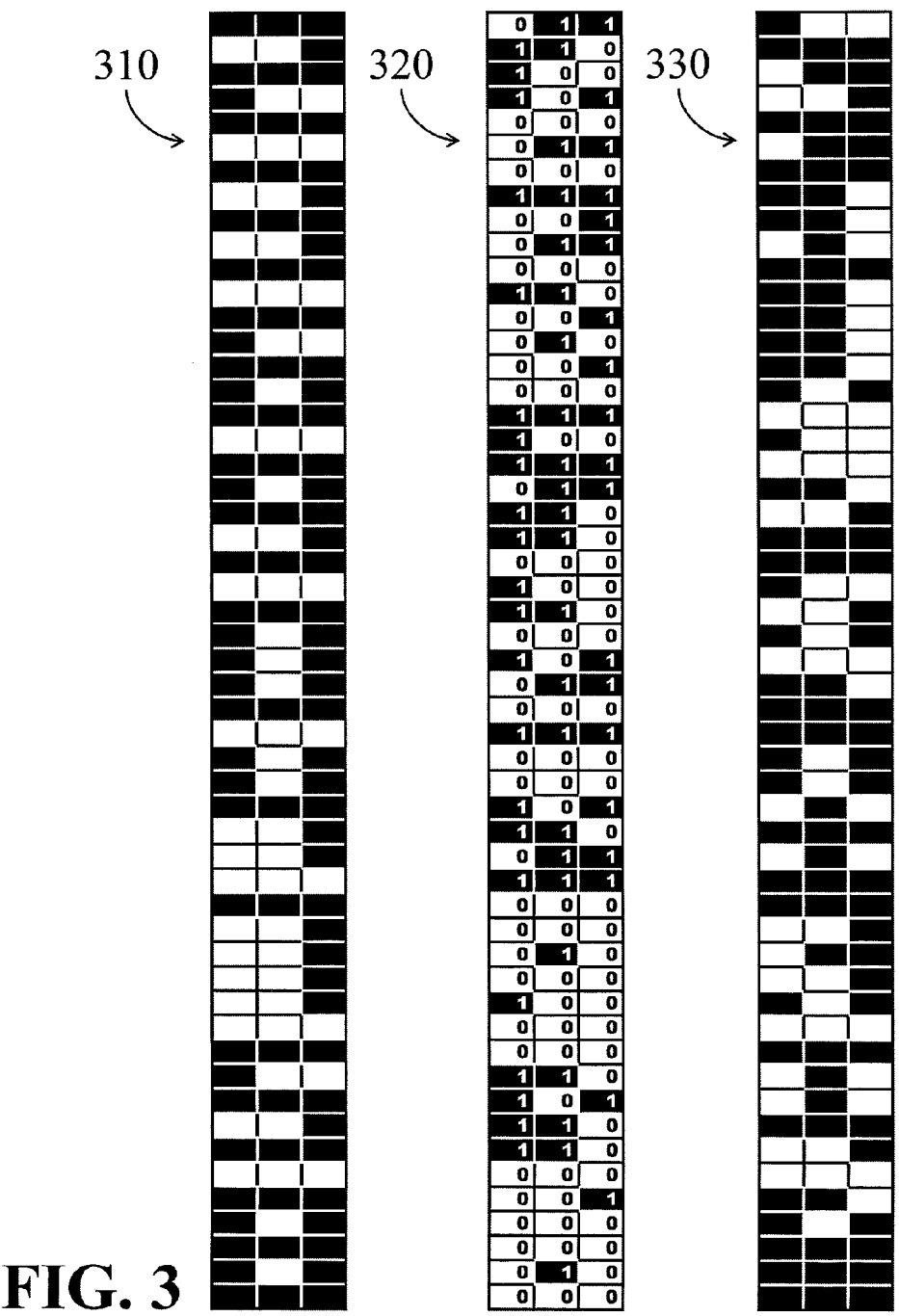
FIG. 3 shows a simplified schematic diagram illustrating an approach for generating an encrypted picture according to an original picture in accordance with one embodiment of the present disclosure.

FIG. 3 shows a simplified schematic diagram illustrating an approach for generating an encrypted picture according to an original picture in accordance with one embodiment of the present disclosure. For the purpose of explanatory convenience in the following description, a static black and white picture that can be represented in 159 bits is utilized as an example original picture 310 in FIG. 3. The content of the original picture contains a string of numbers "236904758." In FIG. 3, each dotted line frame represents a pixel.

In the operation 202, the processor module 111 may utilize various pseudo-random generators to cooperate with a seed key corresponding to the picture ID to generate a random number sequence, and then convert the random number sequence into a corresponding mask picture. In practice, each seed key may correspond to only a single picture ID, or may correspond to a limited number of multiple picture IDs.

In this embodiment, the processor module 111 generates a random number sequence of 159 bits as below: "01110001000100001110110110100100110100001001111000000110001010101010010111100 10010100011100- 10000101100001010010101110010101011000000011010- 010110000000010001 0000"

Then, the processor module 111 may convert the above random number sequence into a mask picture 320 illustrated in FIG. 3. In FIG. 3, the index 0 or 1 labeled in each pixel of the mask picture 320 is utilized for the purpose of easily mapping the color of the pixel to a corresponding number in the above random number sequence, and is not intended to mean that the pixel of the mask picture 320 contains a number.

In the embodiment of FIG. 3, the processor module 111 may encrypt a portion of the original picture 310 or the entire original picture 310 by stacking the original picture 310 with the mask picture 320 in the operation 204 to generate an encrypted picture 330.

When stacking the original picture 310 with the mask picture 320, the processor module 111 may perform an XOR operation on each pixel of the original picture 310 and a pixel of the corresponding position in the mask picture 320 to decide the color of a pixel of the corresponding position in the encrypted picture 330. That is, if a specific pixel in the original picture 310 has the same color as the pixel of the corresponding position in the mask picture 320, then the processor module 111 configures the color of the pixel of the corresponding position in the encrypted picture 330 to be white. If the specific pixel in the original picture 310 has different color with the pixel of the corresponding position in the mask picture 320, then the processor module 111 configures the color of the pixel of the corresponding position in the encrypted picture 330 to be black.

Figure 4:
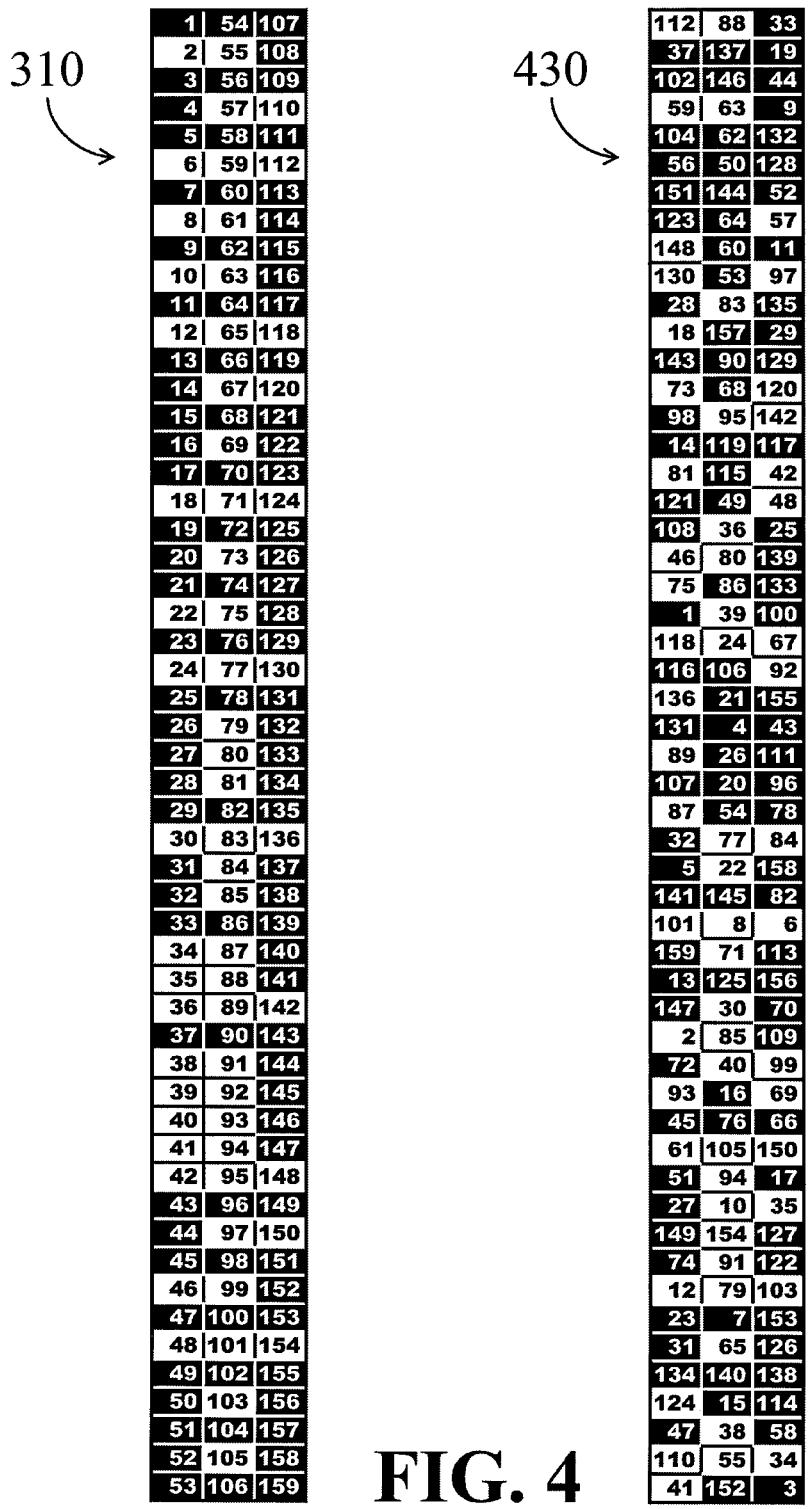
FIG. 4 shows a simplified schematic diagram illustrating an approach for generating an encrypted picture according to an original picture in accordance with another embodiment of the present disclosure.

FIG. 4 shows a simplified schematic diagram illustrating an approach for generating an encrypted picture according to an original picture in accordance with another embodiment of the present disclosure. For the purpose of explanatory convenience in the following description, the original picture 310 shown in FIG. 4 is the same as the original picture 310 shown in FIG. 3.

In the embodiment of FIG. 4, the processor module 111 may utilize a transposition cipher algorithm corresponding to the picture ID to generate a transposition table in the operation 202, and re-arranges positions of multiple or all pixels of the original picture 310 according to the transposition table in the operation 204 to encrypt a portion of the original picture 310 or the entire original picture 310 so as to generate an encrypted picture 430. In FIG. 4, each dotted line frame represents a pixel. The indexes 0~159 labeled in the pixels of the original picture 310 and the encrypted picture 430 are utilized for representing the original positions of respective pixels in the original picture 310, and are not intended to mean that the pixel in the original picture 310 or the encrypted picture 430 contains a number.

As described previously, when encrypting the original picture 310, the processor module 111 may utilize various approaches to encrypt a portion of the original picture 310 or the entire original picture 310. In addition, the processor module 111 may place hidden codes or watermarks on some regions of the original picture 310 as needed.

In an operation 206, the output device 113 of the picture generating device 110 outputs a flat picture corresponding to the encrypted picture. For example, the output device 113 may output the aforementioned encrypted picture 330 or 430 as a flat picture FP. In practice, the flat picture FP may be presented by displaying on a display, or by printing on various media, such as papers, plastic sheets, walls, or the like. Such approach greatly facilitates the applications for mass publishing of private or confidential picture data.

Since the content of the encrypted picture 330 or 430 is the encrypted version of the original picture 310, human eyes are not able to recognize the actual content of the original picture 310 from the encrypted picture 330 or 430, thereby effectively increasing the security in the transmission of picture data.

In an operation 208, the picture generating device 110 provides the picture ID of the encrypted picture. In the foregoing embodiments, the encrypted picture 330 or 430 is generated according to the mask picture or transposition table corresponding to the picture ID of the original picture 310, and thus the picture ID of the original picture 310 may be utilized as the picture ID of the encrypted picture 330 or 430.

In practice, the picture generating device 110 may provide the picture ID by using various approaches, so that the user of the picture presenting device 120 or the picture presenting device 120 is able to receive the picture ID. For example, the picture generating device 110 may utilize a display to display the picture ID, or may simply place the picture ID as plain code on various media, such as papers, plastic sheets, walls, screen, clothes, or the like. In one embodiment, the picture generating device 110 may output the picture ID together with the aforementioned encrypted picture 330 or 430 to form the flat picture FP, so that the picture ID is presented on the flat picture FP as a plain code.

In another embodiment, the picture generating device 110 may first encode the picture ID into a graphic code, such as a two-dimensional barcode or a QR code, and then utilize a display to display the graphic code, or to present the graphic code on various media, such as papers, plastic sheets, walls, screen, clothes, or the like. For example, the picture generating device 110 may output the graphic code together with the encrypted picture 330 or 430 to form the flat picture FP.

Additionally, the picture generating device 110 may provide the picture ID through various wireless transmission approaches. For example, the picture generating device 110 may transmit the picture ID by using a near field communication (NFC) circuit (not shown), or store the picture ID in a RFID tag so that other devices can read it from the RFID tag. In another example, the picture generating device 110 may convert the picture ID into an ultrasonic wave or a cue tone, and utilize an appropriate transmitting circuit to transmit the ultrasonic wave or the cue tone, so that a receiving device can obtain the picture ID by decoding the ultrasonic wave or the cue tone.

It can be appreciated from the foregoing descriptions that the operations 206 and 208 may be performed simultaneously or separately.

In an operation 210, the communication device 114 of the picture generating device 110 transmits the picture ID, or the seed key, the mask picture, or the transposition table corresponding to the picture ID to the viewing control server 130 via internet.

In an operation 212, the viewing control server 130 receives the picture ID, the seed key, the mask picture, or the transposition table transmitted from the picture generating device 110 via internet.

In an operation 214, the picture viewer module 126 utilizes the optical imaging device 125 to capture an image of the flat picture FP formed in the aforementioned operation 206 to generate a captured picture.

In an operation 216, the picture viewer module 126 obtains the picture ID provided by the picture generating device 110.

Depending upon the way the picture generating device 110 provides the picture ID, the user of the picture presenting device 120 or the picture presenting device 120 may utilize corresponding approach to receive the picture ID. For example, in some embodiments where the picture generating device 110 utilizes a display to display the picture ID, or simply places the picture ID as plain code on various media (such as papers, plastic sheets, walls, screen, clothes, or the like), the user of the picture presenting device 120 may simply read the picture ID with human eyes, and then input the picture ID into the picture presenting device 120.

In some embodiments where the picture generating device 110 outputs the encrypted picture together with the picture ID to form the flat picture FP, the image of the picture ID would be contained in the captured picture generated by the picture generating device 110 in the operation 214. Accordingly, the picture viewer module 126 may utilize the processor module 121 to perform an optical character recognition (OCR) on the captured picture in the operation 216 to obtain the content of the picture ID.

For example, in some embodiments where the picture generating device 110 encodes the picture ID into the graphic code and utilizes the display to display the graphic code, or to present the graphic code on various media (such as papers, plastic sheets, walls, screen, clothes, or the like), the picture viewer module 126 may utilize the optical imaging device 125 to capture the image of the graphic code in the operation 216, and utilize the processor module 121 to decode the graphic code to obtain the content of the picture ID.

In some embodiments where the picture generating device 110 outputs the graphic code together with the encrypted picture to form the flat picture FP, the image of the graphic code would be contained in the captured picture generated by the picture generating device 110 in the operation 214. Accordingly, the picture viewer module 126 may utilize the processor module 121 to decode a portion of the captured picture with respect to the graphic code in the operation 216 to obtain the content of the picture ID.

In some embodiments where the picture generating device 110 transmits the picture ID by using the wireless transmission approach (such as through the NFC circuit, or transmitting the picture ID in the format of an ultrasonic wave or a cue tone), the picture viewer module 126 may utilize a corresponding wireless transmission approach to receive the signals transmitted from the picture generating device 110 to obtain the content of the picture ID. For example, the picture viewer module 126 may utilize a wireless communication circuit, such as a NFC circuit or other appropriate transmitting circuit (not shown), to receive the wireless signals transmitted from the picture generating device 110.

In some embodiments where the picture generating device 110 stores the picture ID in a RFID tag, the picture viewer module 126 may utilize a corresponding RFID reader (not shown) to read the RFID tag to obtain the picture ID.

It can be appreciated from the foregoing descriptions that the picture generating device 110 may deliver the encrypted picture and corresponding picture ID to the picture presenting device 120 through the same channel, or may separately deliver the encrypted picture and corresponding picture ID to the picture presenting device 120 through different channels. Such architecture creates benefits for increasing the convenience and flexibility for the transmission of the encrypted picture and the picture ID. In addition, the security in the transmission of private or confidential picture data can be further enhanced by adopting the approach of separately delivering the encrypted picture and the picture ID.

In an operation 218, the picture viewer module 126 utilizes the communication device 124 to transmit an entity identification request and the picture ID to the viewing control server 130 via internet.

In an operation 220, the viewing control server 130 receives the entity identification request and the picture ID transmitted from the picture presenting device 120.

In an operation 222, the viewing control server 130 conducts an entity identification procedure with the picture presenting device 120. For example, the viewing control server 130 may request the picture presenting device 120 to provide a correct pairing of a user name (or device ID) and a password, or to provide a pre-registered electronic signature for verifying the entity identification. If the picture presenting device 120 passed the entity identification procedure conducted by the viewing control server 130, then the viewing control server 130 proceeds to an operation 224. On the contrary, if the picture presenting device 120 can not pass the entity identification procedure conducted by the viewing control server 130, then the viewing control server 130 proceeds to an operation 232.

In the operation 224, the viewing control server 130 transmits a decryption information to the picture presenting device 120 via internet. The aforementioned decryption information comprises at least one of the seed key, the mask picture, and the transposition table corresponding to the picture ID of the encrypted picture.

In some embodiments where the picture generating device 110 transmits the picture ID to the viewing control server 130 in the operation 210, the viewing control server 130 may generate a corresponding mask picture or a transposition table according to the picture ID, and transmit the generated mask picture or transposition table to the picture presenting device 120 in the operation 224.

In some embodiments where the picture generating device 110 transmits the seed key corresponding to the picture ID to the viewing control server 130 in the operation 210, the viewing control server 130 may generate a corresponding mask picture according to the seed key, and transmit the generated mask picture to the picture presenting device 120 in the operation 224.

In some embodiments where the picture generating device 110 transmits the mask picture or the transposition table corresponding to the picture ID to the viewing control server 130 in the operation 210, the viewing control server 130 may simply transmit the mask picture or the transposition table to the picture presenting device 120 in the operation 224.

In an operation 226, the picture viewer module 126 utilizes the communication device 124 to receive the decryption information transmitted from the viewing control server 130 via internet.

In an operation 228, the picture viewer module 126 utilizes the processor module 121 to process the captured picture generated in the operation 214 according to the decryption information transmitted from the viewing control server 130 to obtain a decrypted picture DP. In normal situations, the decrypted picture DP contains the content of the original picture.

For example, in some embodiments where the decryption information transmitted from the viewing control server 130 is a seed key corresponding to the picture ID, the picture viewer module 126 may utilize the processor module 121 to generate a corresponding mask picture according to the seed key in the operation 228, and then stack the generated mask picture with the captured picture to obtain the decrypted picture DP.

In some embodiments where the decryption information transmitted from the viewing control server 130 is a mask picture corresponding to the seed key, the picture viewer module 126 may utilize the processor module 121 to directly stack the mask picture transmitted from the viewing control server 130 with the captured picture to obtain the decrypted picture DP.

In some embodiments where the decryption information transmitted from the viewing control server 130 is a transposition table corresponding to the picture ID, the picture viewer module 126 may utilize the processor module 121 to re-arranges positions of multiple pixels of the captured picture according to the transposition table in the operation 228 to obtain the decrypted picture DP.

Afterwards, the picture viewer module 126 proceeds to an operation 230 to utilize the display device 123 to display the decrypted picture DP to the user.

In the operation 232, the viewing control server 130 may transmit an error message indicating that the entity identification is failed to the picture presenting device 120 via internet.

In an operation 234, the picture viewer module 126 may utilize the communication device 124 to receive the error message and utilize the display device 123 to display the error message so as to inform the user.

As described above, different pictures that the picture generating device 110 want to deliver to the picture presenting device 120 have different picture IDs, so these different pictures have different seed keys, mask pictures, or transposition tables. If the picture generating device 110 want to deliver different pictures to the picture presenting device 120, the picture generating device 110 may adopt the aforementioned method to respectively generate multiple mask pictures for multiple different original pictures, and to respectively stack the multiple mask pictures with the multiple original pictures to generate multiple different encrypted pictures, wherein the multiple mask pictures are respectively corresponding to multiple picture IDs of the multiple original pictures.

Alternatively, the picture generating device 110 may respectively re-arranges positions of multiple pixels of multiple different original pictures according to multiple transposition tables to generate multiple different encrypted pictures, wherein the multiple transposition tables are respectively corresponding to multiple picture IDs of the multiple original pictures.

Accordingly, when the picture presenting device 120 only obtains the decryption information of a specific encrypted picture, the picture presenting device 120 is allowed to decrypt only the specific encrypted picture, and not able to decrypt other encrypted pictures. As a result, the proposed approach is capable of effectively preventing private or confidential picture data from being easily cracked.

It can be appreciated from the foregoing descriptions that the picture delivering system 100 has a viewing control mechanism. Only the picture presenting device 120 which passed the entity identification procedure of the viewing control server 130 and obtained a correct picture ID is allowed to successfully generate and display the decrypted picture DP having the same content as the original picture 310, so the viewing authority of private or confidential picture data can be effectively controlled and managed.

Figure 5:
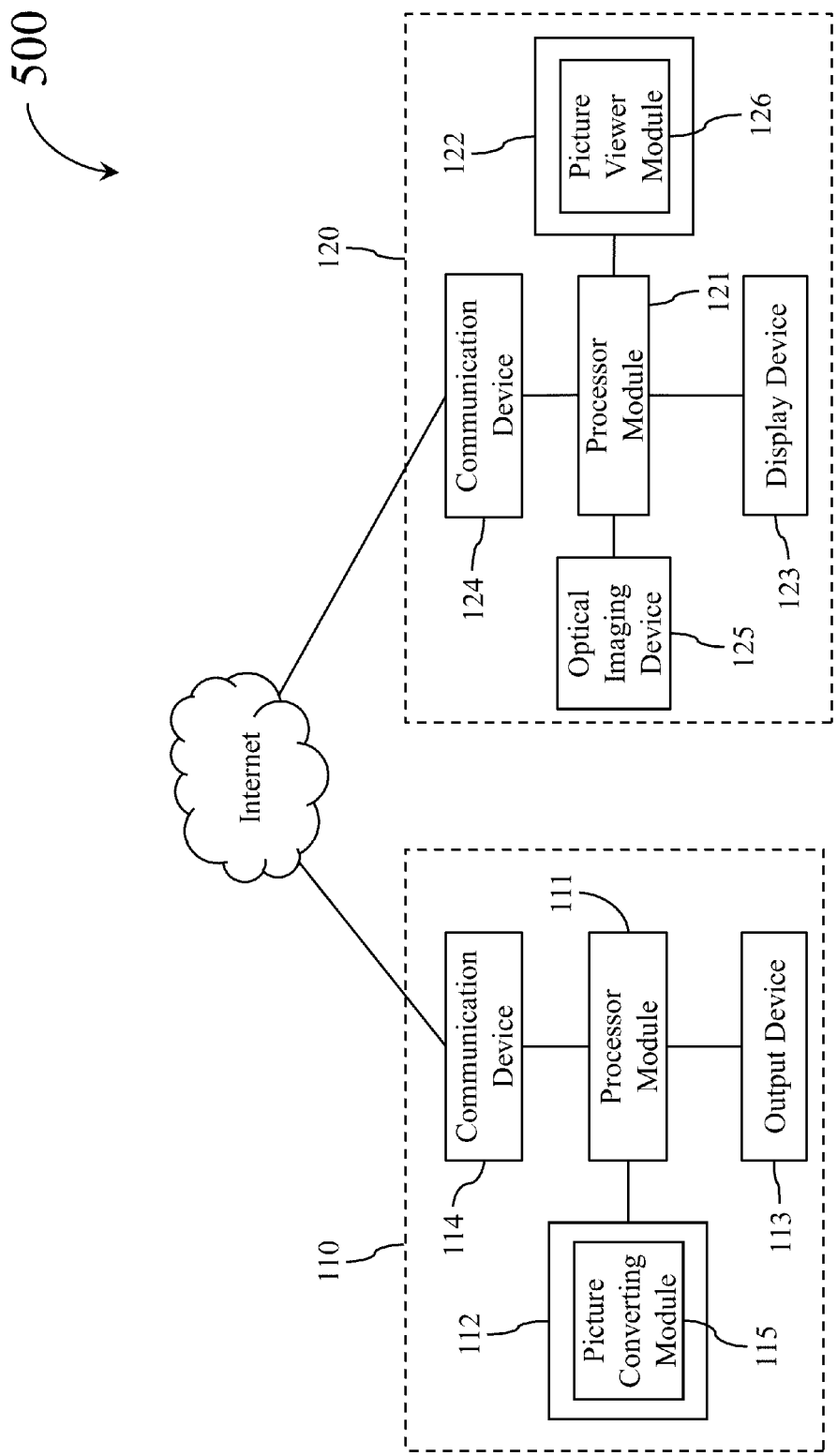
FIG. 5 shows a simplified functional block diagram of a picture delivering system based on visual cryptography according to another embodiment of the present disclosure.

Please refer to FIG. 5, which shows a simplified functional block diagram of a picture delivering system 500 based on visual cryptography according to another embodiment of the present disclosure. The picture delivering system 500 is similar to the aforementioned picture delivering system 100, but the viewing control server 130 is omitted in the picture delivering system 500. In the picture delivering system 500, the functionality of the aforementioned viewing control server 130 is integrated into the picture generating device 110.

The descriptions regarding the operations and implementations of other devices in the picture delivering system 100 are also applicable to the embodiment of FIG. 5. For simplicity, relevant descriptions will not be repeated here.

The operations of the picture delivering system 500 will be further described in the following with reference to FIG. 6.

Figure 6:
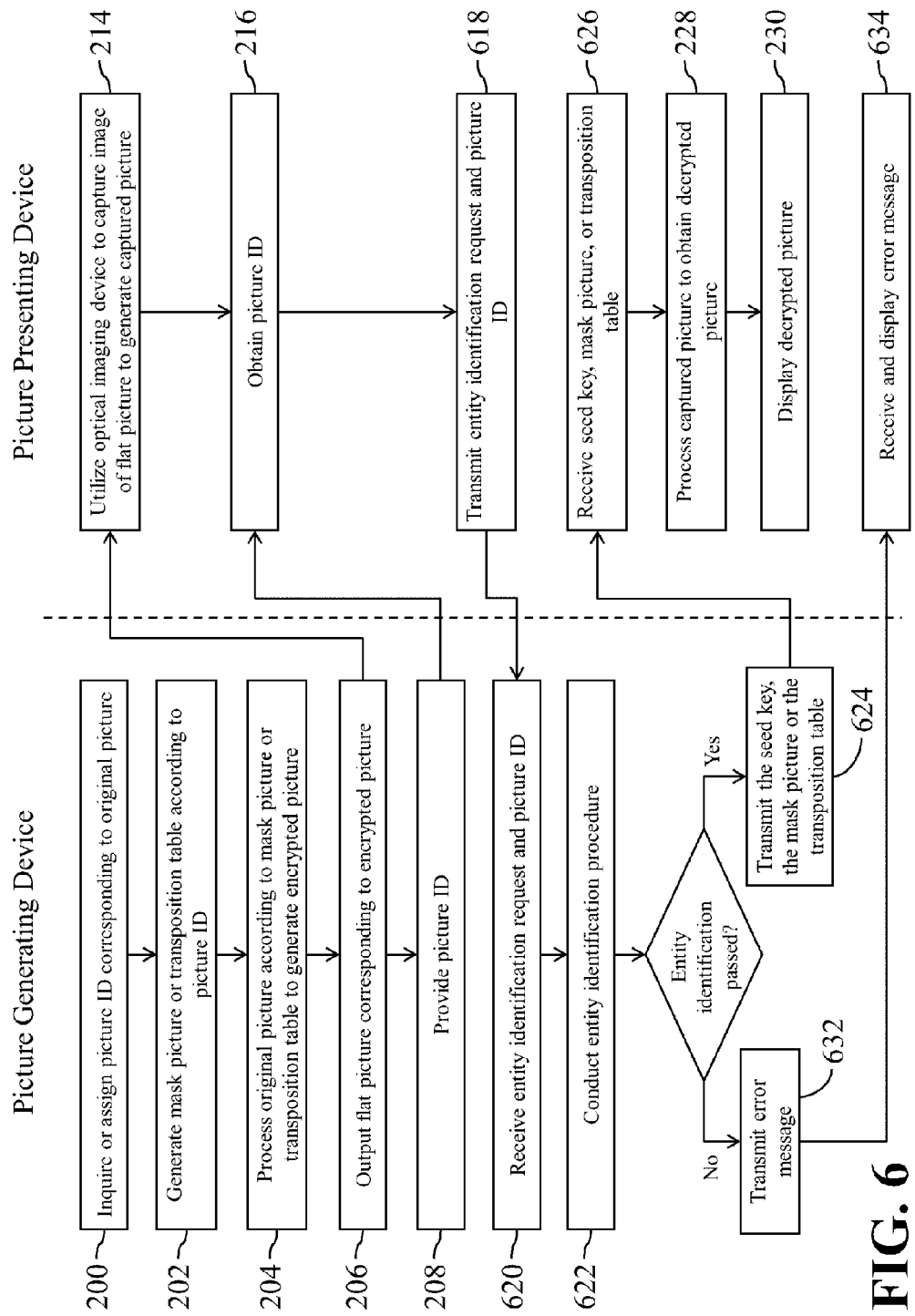
FIG. 6 shows a simplified flowchart illustrating a picture delivering method according to a second embodiment of the present disclosure.

FIG. 6 shows a simplified flowchart illustrating a picture delivering method according to a second embodiment of the present disclosure. In FIG. 6, the left column represents operations to be performed by the picture generating device 110, and the right column represents operations to be performed by the picture presenting device 120. When the picture delivering system 500 performs the picture delivering method illustrated in FIG. 6, the processor module 111 of the picture generating device 110 executes the picture converting module 115 to enable the picture generating device 110 to perform some or all operations within the left column of FIG. 6, and the processor module 121 of the picture presenting device 120 executes the picture viewer module 126 to enable the picture presenting device 120 to perform some or all operations within the right column of FIG. 6.

In the embodiment of FIG. 6, the functionality of the aforementioned viewing control server 130 is realized by the picture generating device 110. Accordingly, in an operation 618, the picture viewer module 126 utilizes the communication device 124 to transmit an entity identification request and the picture ID to the picture generating device 110 via internet.

In an operation 620, the picture converting module 115 of the picture generating device 110 utilizes the communication device 114 to receive the entity identification request and the picture ID transmitted from the picture presenting device 120.

In an operation 622, the picture converting module 115 conducts an entity identification procedure with the picture presenting device 120. For example, the picture converting module 115 may request the picture presenting device 120 to provide a correct pairing of a user name (or device ID) and a password, or to provide a pre-registered electronic signature for verifying the entity identification. If the picture presenting device 120 passed the entity identification procedure conducted by the picture generating device 110, then the picture generating device 110 proceeds to an operation 624. On the contrary, if the picture presenting device 120 can not pass the entity identification procedure conducted by the picture generating device 110, then the picture generating device 110 proceeds to an operation 632.

In the operation 224, the picture converting module 115 utilizes the communication device 114 to transmit a decryption information to the picture presenting device 120 via internet. The aforementioned decryption information comprises at least one of the seed key, the mask picture, and the transposition table corresponding to the picture ID of the encrypted picture.

In an operation 626, the picture viewer module 126 utilizes the communication device 124 to receive the decryption information transmitted from the picture generating device 110 via internet.

The operations and variety of the implementations of the operations 624 and 626 are respectively the same as the aforementioned operations 224 and 226. Accordingly, the descriptions regarding the operation and advantages or the operations 224 and 226 of FIG. 2 are also applicable to the operations 624 and 626 of FIG. 6.

When the decryption information is received by the communication device 124, the picture viewer module 126 utilizes the processor module 121 to perform the aforementioned operation 228.

In the operation 632, the picture generating device 110 may transmit an error message indicating that the entity identification is failed to the picture presenting device 120 via internet.

In an operation 634, the picture viewer module 126 may utilize the communication device 124 to receive the error message and utilize the display device 123 to display the error message so as to inform the user.

Other operations in FIG. 6 are the same as corresponding operations in FIG. 2, and thus the descriptions regarding the corresponding operations in FIG. 2 and relevant advantages are also applicable to the embodiment in FIG. 6.

In the above embodiments, the picture presenting device 120 is allowed to receive the decryption information transmitted from the picture generating device 110 or the viewing control server 130 only if it passed the entity identification procedure. That is, the entity identification procedure and the delivering of the decryption information are separate operations. This is merely an embodiment, rather than a restriction to the practical implementations. In practice, the entity identification procedure and the delivering of the decryption information may be integrated together.

Figure 7:
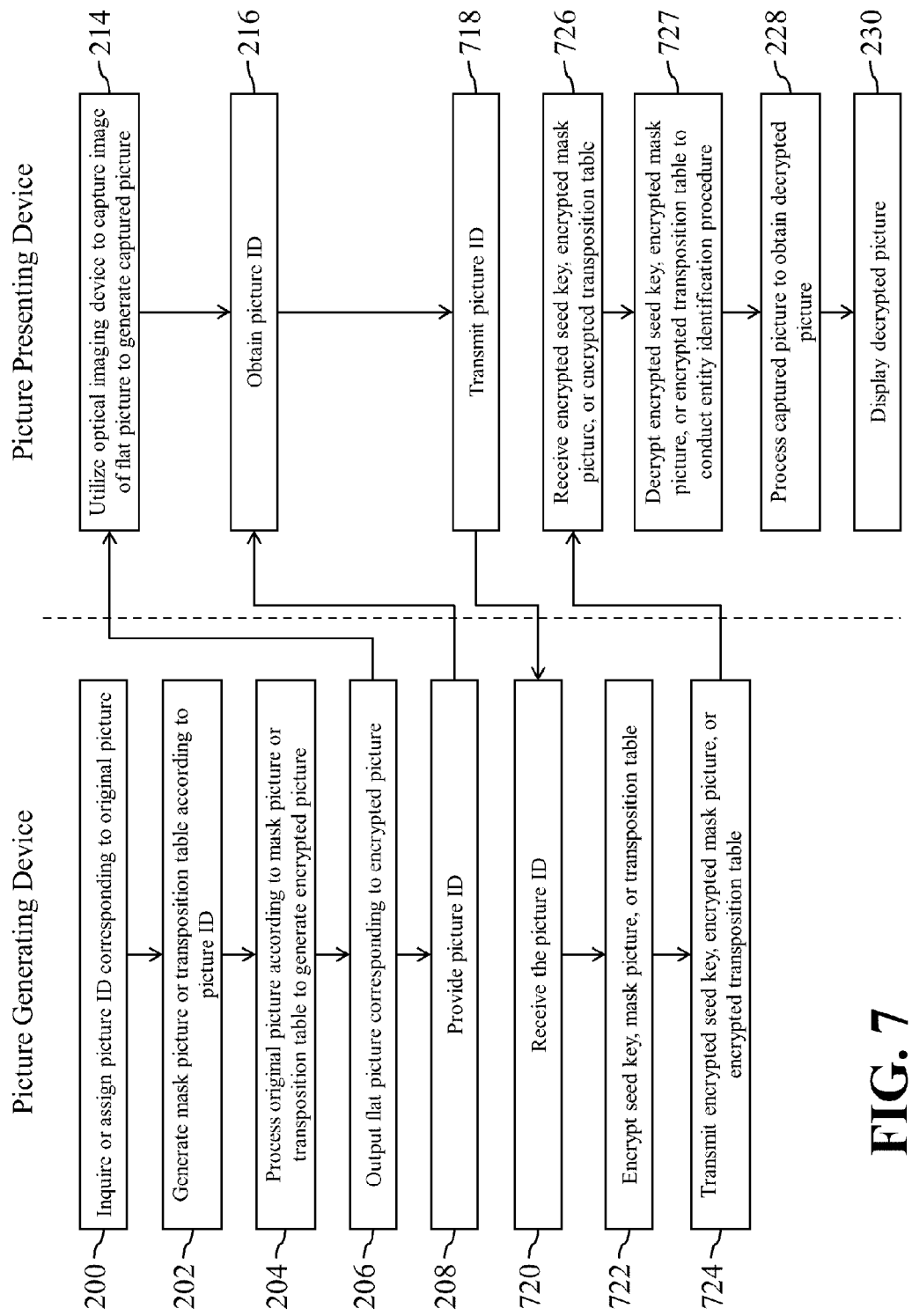
FIG. 7 shows a simplified flowchart illustrating a picture delivering method according to a third embodiment of the present disclosure.

For example, FIG. 7 shows a simplified flowchart illustrating a picture delivering method according to a second embodiment of the present disclosure. Similar to the embodiment of FIG. 6, the functionality of the aforementioned viewing control server 130 is also realized by the picture generating device 110 in the embodiment of FIG. 7.

In the embodiment of FIG. 7, when the picture ID is obtained by the picture presenting device 120 in the operation 216, the picture viewer module 126 performs an operation 718 to utilize the communication device 124 to transmit the picture ID to the picture generating device 110 via internet.

In an operation 720, the picture converting module 115 of the picture generating device 110 utilizes the communication device 114 to receive the picture ID transmitted from the picture presenting device 120.

In an operation 722, the picture converting module 115 utilizes the processor module 111 to encrypt a decryption information by using such an approach that only valid users can decrypt it. The aforementioned decryption information comprises at least one of the seed key, the mask picture, and the transposition table corresponding to the picture ID of the encrypted picture. For example, the processor module 111 may utilize an encryption program, which corresponds to a decryption program only possessed by valid users, to encrypt the aforementioned decryption information. In another example, the processor module 111 may utilize an encryption key or electronic certificate that is only possessed by valid users to encrypt the aforementioned decryption information.

In an operation 724, the picture converting module 115 utilizes the communication device 114 to transmit the encrypted decryption information to the picture presenting device 120 via internet.

In an operation 726, the picture viewer module 126 utilizes the communication device 124 to receive the encrypted decryption information transmitted from the picture generating device 110 via internet.

In an operation 727, the picture viewer module 126 utilizes the processor module 121 to decrypt the encrypted decryption information to conduct an entity identification procedure. In this embodiment, only the picture presenting device 120 possessed by valid users is capable of successfully obtaining the decryption information by decrypting the encrypted decryption information as the picture presenting device 120 has corresponding decryption program or decryption key. Other device possessed by an invalid user is unable to decrypt the encrypted decryption information due to the lack of correct decryption program or decryption key, and is thus not allowed to obtain the decryption information. Accordingly, if the encrypted decryption information is successfully decrypted by the processor module 121, it means that the picture presenting device 120 passed the entity identification procedure. In this situation, the picture presenting device 120 also obtains the decryption information.

It can be appreciated from the foregoing descriptions that the above operations conducted by the picture generating device 110, i.e., encrypting the decryption information by using such an approach that only valid users can decrypt it and transmitting the encrypted decryption information to the picture presenting device 120, also embody an entity identification operation. In other words, the entity identification procedure and the delivering of the decryption information are conducted separately in the embodiment of FIG. 6, but they are conducted integrally in the embodiment of FIG. 7.

After the decryption information is obtained by the picture presenting device 120, the picture viewer module 126 utilizes the processor module 121 to perform the aforementioned operation 228.

Other operations in FIG. 7 and variety of the implementations thereof are the same as corresponding operations in FIG. 2, and thus the descriptions regarding the corresponding operations in FIG. 2 and relevant advantages are also applicable to the embodiment in FIG. 7.

Figure 8:
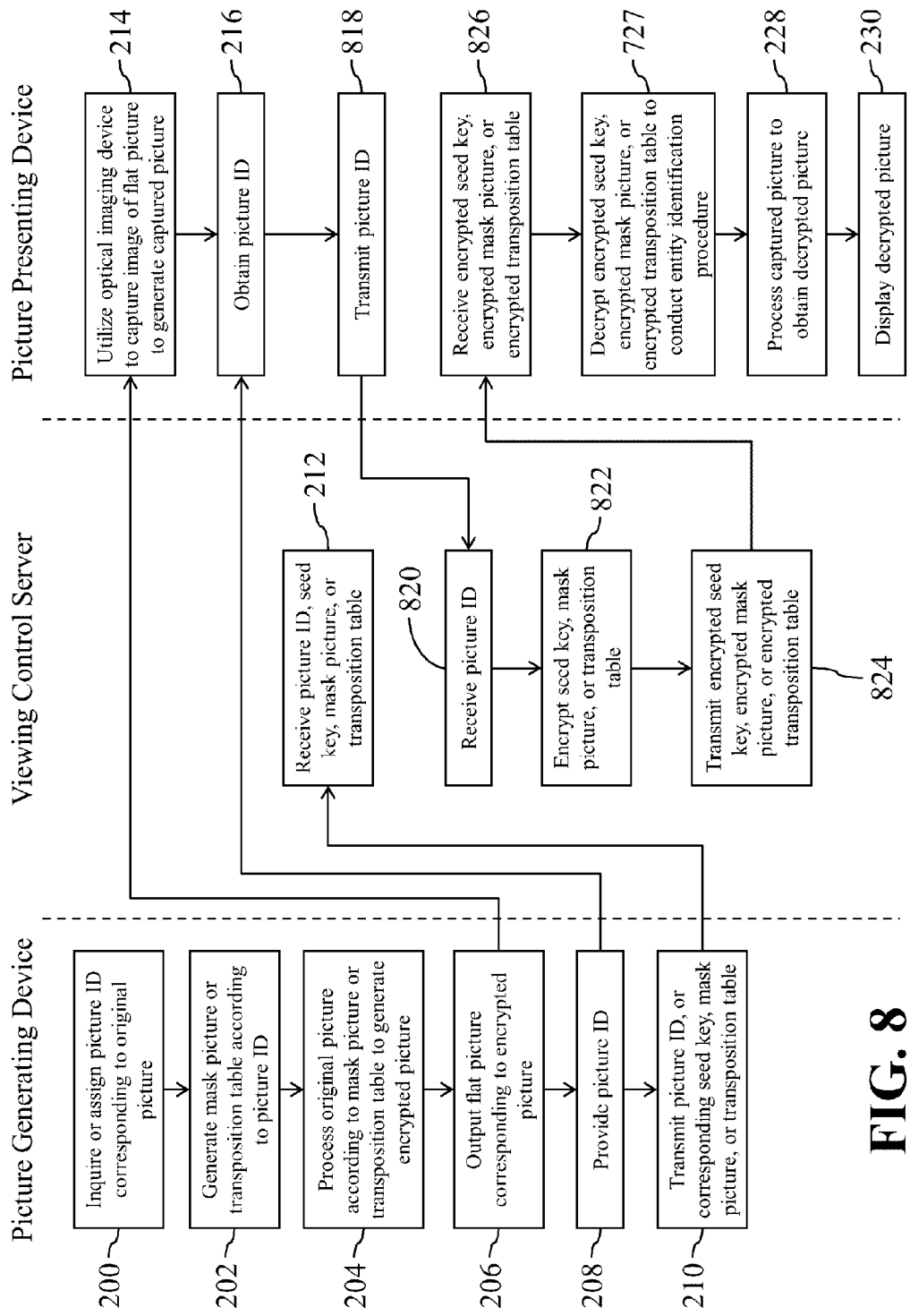
FIG. 8 shows a simplified flowchart illustrating a picture delivering method according to a fourth embodiment of the present disclosure.

For another example, FIG. 8 shows a simplified flowchart illustrating a picture delivering method according to a fourth embodiment of the present disclosure. Similar to the embodiment of FIG. 2, the picture delivering method of FIG. 8 also utilizes the viewing control server 130 to control and manage the viewing authority of private or confidential picture.

In the embodiment of FIG. 8, when the picture ID is obtained by the picture presenting device 120 in the operation 216, the picture viewer module 126 performs an operation 818 to utilize the communication device 124 to transmit the picture ID to the viewing control server 130 via internet.

In an operation 820, the viewing control server 130 receives the picture ID transmitted from the picture presenting device 120.

In an operation 822, the viewing control server 130 encrypts a decryption information by using such an approach that only valid users can decrypt it. The aforementioned decryption information comprises at least one of the seed key, the mask picture, and the transposition table corresponding to the picture ID of the encrypted picture. For example, the viewing control server 130 may utilize an encryption program, which corresponds to a decryption program only possessed by valid users, to encrypt the aforementioned decryption information. In another example, the viewing control server 130 may utilize an encryption key or electronic certificate that is only possessed by valid users to encrypt the aforementioned decryption information.

In an operation 824, the viewing control server 130 transmits the encrypted decryption information to the picture presenting device 120 via internet.

In an operation 826, the picture viewer module 126 utilizes the communication device 124 to receive the encrypted decryption information transmitted from the viewing control server 130 via internet.

Then, the picture viewer module 126 utilizes the processor module 121 to perform the aforementioned operation 727.

Similar to the embodiment of FIG. 7, if the encrypted decryption information is successfully decrypted by the processor module 121, it means that the picture presenting device 120 passed the entity identification procedure. In this situation, the picture presenting device 120 also obtains the decryption information.

It can be appreciated from the foregoing descriptions that the above operations conducted by the viewing control server 130, i.e., encrypting the decryption information by using such an approach that only valid users can decrypt it and transmitting the encrypted decryption information to the picture presenting device 120, also embody an entity identification operation. In other words, the entity identification procedure and the delivering of the decryption information are conducted separately in the embodiment of FIG. 2, but they are conducted integrally in the embodiment of FIG. 8.

After the decryption information is obtained by the picture presenting device 120, the picture viewer module 126 utilizes the processor module 121 to perform the aforementioned operation 228.

Other operations in FIG. 8 and variety of the implementations thereof are the same as corresponding operations in FIG. 2, and thus the descriptions regarding the corresponding operations in FIG. 2 and relevant advantages are also applicable to the embodiment in FIG. 8.

Additionally, in the operation 204 of each of the aforementioned embodiments, the processor module 111 of the picture generating device 110 may combine the methods illustrated in FIG. 3 and FIG. 4 to generate an encrypted picture. For example, in one embodiment, the processor module 111 may stack the original picture with the mask picture to generate an intervening encryption picture, and then re-arrange positions of multiple pixels of the intervening encryption picture according to the transposition table to generate a final encrypted picture. In this case, the picture viewer module 126 may utilize the processor module 121 to re-arrange positions of multiple pixels of the intervening encryption picture according to the transposition table to generate an intervening encryption picture, and then to stack the mask picture with the intervening encryption picture in the operation 228 to generate a final decrypted picture. Such operation is capable of further enhancing the encryption effect for the content of the original picture.

Alternatively, the processor module 111 may re-arrange positions of multiple pixels of an original picture according to the transposition table to generate an intervening encryption picture, and then stacks the mask picture with the intervening encryption picture to generate a final encrypted picture. In this case, the picture viewer module 126 may utilize the processor module 121 to stack the mask picture with the captured picture in the operation 228 to generate an intervening encryption picture, and then to re-arrange positions of multiple pixels of the intervening encryption picture according to the transposition table to generate a final decrypted picture. Such operation is capable of further enhancing the encryption effect for the content of the original picture.

Similar to the previous embodiments, when encrypting the original picture, the processor module 111 may utilize various approaches described previously to encrypt a portion of the original picture or the entire original picture 310. In addition, the processor module 111 may place hidden codes or watermarks on some regions of the original picture as needed.

Please note that the executing order of the operations in each of the previous embodiments is merely an example, rather than a restriction to the practical implementations. For example, the operations 206, 208, and 210 in FIG. 2 and FIG. 8 may be performed in any order, and the operations 212, 214, and 216 may be performed in any order. The operations 206 and 208 in FIG. 6 and FIG. 7 may be swapped or may be performed simultaneously.

As can be appreciated from the foregoing descriptions, viewing control mechanism with respect the picture data could be easily achieved in the proposed picture delivering system 100 or 500. The proposed picture delivering system 100 or 500 increases both the security and convenience in the transmission of private or confidential picture data.

Additionally, in each of the previous embodiments, the picture presenting device 120 is allowed to correctly decrypt the encrypted picture only if the picture presenting device 120 is installed with a valid picture viewer module 126 and obtains a correct picture ID. This provides additional security to the viewing control of the private or confidential picture data. Accordingly, the proposed picture delivering system and related computer program products create great benefit for the development and promotion of paperless applications.

Furthermore, in the aforementioned picture delivering system 100, the viewing control server 130 is enabled to control and manage the viewing authority of the private or confidential picture data, and the viewing control server 130 and its administrator do not need to contact with or to access the content of the original picture at all. Accordingly, the picture generating device 110 is allowed to not provide the picture data of the original picture to the viewing control server 130 and its administrator, thereby preventing the private or confidential picture data from leaking out without decent authority.

The same reference numbers may be used throughout the drawings to refer to the same or like parts, components, or operations. Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A picture delivering system based on visual cryptography, comprising:
   a viewing control server;
   a picture generating device, configured to operably output a flat picture corresponding to an encrypted picture, to operably provide a picture ID corresponding to the encrypted picture, and to operably transmit the picture ID, or a seed key, a mask picture, or a transposition table corresponding to the picture ID to the viewing control server; and a picture presenting device, configured to operably utilize an optical imaging device to optically capture an image of the flat picture to generate a captured picture, to operably obtain the picture ID, and to operably transmit the picture ID to the viewing control server via internet;

wherein the viewing control server conducts an entity identification procedure with the picture presenting device, and when the picture presenting device passed the entity identification procedure, the picture presenting device obtains a decryption information, processes the captured picture according to the decryption information to obtain a decrypted picture, and then utilizes a display device to display the decrypted picture;

wherein the decryption information comprises at least one of the seed key, the mask picture, and the transposition table, and the picture generating device re-arranges positions of multiple pixels of an original picture according to the transposition table to generate the encrypted picture.

2. The picture delivering system of claim 1, wherein the picture generating device outputs the encrypted picture together with the picture ID to form the flat picture, and the picture presenting device conducts an optical character recognition on the captured picture to obtain the picture ID.

3. The picture delivering system of claim 1, wherein the picture generating device outputs the encrypted picture together with a graphic code to form the flat picture, and the picture presenting device decodes the captured picture to obtain the picture ID;

wherein the graphic code is generated based on an encoded picture ID.

4. The picture delivering system of claim 1, wherein the picture presenting device receives the picture ID through a wireless communication approach.

5. The picture delivering system of claim 1, wherein the picture generating device respectively re-arranges positions of multiple pixels of multiple different original pictures according to multiple transposition tables to generate multiple different encrypted pictures;

wherein the multiple transposition tables are respectively corresponding to multiple picture IDs of the multiple original pictures.

6. The picture delivering system of claim 1, wherein the picture generating device transmits the transposition table to the viewing control server and the picture presenting device obtains the transposition table when passed the entity identification procedure;

wherein the picture presenting device re-arranges positions of multiple pixels of the captured picture according to the transposition table to obtain the decrypted picture.

7. The picture delivering system of claim 1, wherein the picture generating device transmits the picture ID to the viewing control server, the viewing control server generates a transposition table corresponding to the picture ID, and the picture presenting device obtains the transposition table when passed the entity identification procedure;

wherein the picture presenting device re-arranges positions of multiple pixels of the captured picture according to the transposition table to obtain the decrypted picture.

8. The picture delivering system of claim 1, wherein the viewing control server transmits the decryption information to the picture presenting device via internet when the picture presenting device passed the entity identification procedure.

9. The picture delivering system of claim 1, wherein the viewing control server encrypts the decryption information and transmits the encrypted decryption information to the picture presenting device, and the picture presenting device decrypts the encrypted decryption information and then to conduct the entity identification procedure.

10. A picture delivering system based on visual cryptography, comprising:

a viewing control server;

a picture generating device, configured to operably output a flat picture corresponding to an encrypted picture, to operably provide a picture ID corresponding to the encrypted picture, and to operably transmit the picture ID, or a seed key, a mask picture, or a transposition table corresponding to the picture ID to the viewing control server; and a picture presenting device, configured to operably utilize an optical imaging device to optically capture an image of the flat picture to generate a captured picture, to operably obtain the picture ID, and to operably transmit the picture ID to the viewing control server via internet;

wherein the viewing control server conducts an entity identification procedure with the picture presenting device, and when the picture presenting device passed the entity identification procedure, the picture presenting device obtains a decryption information, processes the captured picture according to the decryption information to obtain a decrypted picture, and then utilizes a display device to display the decrypted picture;

wherein the decryption information comprises at least one of the seed key, the mask picture, and the transposition table, the picture generating device stacks an original picture with the mask picture to generate an intervening encryption picture, and then re-arranges positions of multiple pixels of the intervening encryption picture according to the transposition table to generate the encrypted picture.

11. A picture delivering system based on visual cryptography, comprising:

a viewing control server;

a picture generating device, configured to operably output a flat picture corresponding to an encrypted picture, to operably provide a picture ID corresponding to the encrypted picture, and to operably transmit the picture ID, or a seed key, a mask picture, or a transposition table corresponding to the picture ID to the viewing control server; and a picture presenting device, configured to operably utilize an optical imaging device to optically capture an image of the flat picture to generate a captured picture, to operably obtain the picture ID, and to operably transmit the picture ID to the viewing control server via internet;

wherein the viewing control server conducts an entity identification procedure with the picture presenting device, and when the picture presenting device passed the entity identification procedure, the picture presenting device obtains a decryption information, processes the captured picture according to the decryption information to obtain a decrypted picture, and then utilizes a display device to display the decrypted picture;

wherein the decryption information comprises at least one of the seed key, the mask picture, and the transposition table, the picture generating device re-arranges positions of multiple pixels of an original picture according to the transposition table to generate an intervening encryption picture, and then stacks the mask picture with the intervening encryption picture to generate the encrypted picture.

12. A picture delivering system based on visual cryptography, comprising:
- a picture generating device, configured to operably output a flat picture corresponding to an encrypted picture and to operably provide a picture ID corresponding to the encrypted picture; and
- a picture presenting device, configured to operably utilize an optical imaging device to optically capture an image of the flat picture to generate a captured picture, to operably obtain the picture ID, and to operably transmit the picture ID to the picture generating device via internet;
- wherein the picture generating device conducts an entity identification procedure with the picture presenting device, and when the picture presenting device passed the entity identification procedure, the picture presenting device obtains a decryption information, processes the captured picture according to the decryption information to obtain a decrypted picture, and then utilizes a display device to display the decrypted picture;
- wherein the decryption information comprises at least one of a seed key, a mask picture, and a transposition table corresponding to the picture ID, and the picture generating device re-arranges positions of multiple pixels of an original picture according to the transposition table to generate the encrypted picture.

13. The picture delivering system of claim 12, wherein the picture generating device outputs the encrypted picture together with the picture ID to form the flat picture, and the picture presenting device conducts an optical character recognition on the captured picture to obtain the picture ID.

14. The picture delivering system of claim 12, wherein the picture generating device outputs the encrypted picture together with a graphic code to form the flat picture, and the picture presenting device decodes the captured picture to obtain the picture ID;
- wherein the graphic code is encoded based on the picture ID.

15. The picture delivering system of claim 12, wherein the picture presenting device receives the picture ID through a wireless communication approach.

16. The picture delivering system of claim 12, wherein the picture generating device respectively re-arranges positions of multiple pixels of multiple different original pictures according to multiple transposition tables to generate multiple different encrypted pictures;
- wherein the multiple transposition tables are respectively corresponding to multiple picture IDs of the multiple original pictures.

17. The picture delivering system of claim 12, wherein the picture presenting device obtains the transposition table when passed the entity identification procedure;
- wherein the picture presenting device re-arranges positions of multiple pixels of the captured picture according to the transposition table to obtain the decrypted picture.

18. The picture delivering system of claim 12, wherein the picture generating device transmits the decryption information to the picture presenting device via internet when the picture presenting device passed the entity identification procedure.

19. The picture delivering system of claim 12, wherein the picture generating device encrypts the decryption information and transmits the encrypted decryption information to the picture presenting device, and the picture presenting device decrypts the encrypted decryption information and then to conduct the entity identification procedure.

20. A picture delivering system based on visual cryptography, comprising:
- a picture generating device, configured to operably output a flat picture corresponding to an encrypted picture and to operably provide a picture ID corresponding to the encrypted picture; and
- a picture presenting device, configured to operably utilize an optical imaging device to optically capture an image of the flat picture to generate a captured picture, to operably obtain the picture ID, and to operably transmit the picture ID to the picture generating device via internet;
- wherein the picture generating device conducts an entity identification procedure with the picture presenting device, and when the picture presenting device passed the entity identification procedure, the picture presenting device obtains a decryption information, processes the captured picture according to the decryption information to obtain a decrypted picture, and then utilizes a display device to display the decrypted picture;
- wherein the decryption information comprises at least one of a seed key, a mask picture, and a transposition table corresponding to the picture ID, the picture generating device stacks an original picture with the mask picture to generate an intervening encryption picture, and then re-arranges positions of multiple pixels of the intervening encryption picture according to the transposition table to generate the encrypted picture.

21. A picture delivering system based on visual cryptography, comprising:
- a picture generating device, configured to operably output a flat picture corresponding to an encrypted picture and to operably provide a picture ID corresponding to the encrypted picture; and
- a picture presenting device, configured to operably utilize an optical imaging device to optically capture an image of the flat picture to generate a captured picture, to operably obtain the picture ID, and to operably transmit the picture ID to the picture generating device via internet;
- wherein the picture generating device conducts an entity identification procedure with the picture presenting device, and when the picture presenting device passed the entity identification procedure, the picture presenting device obtains a decryption information, processes the captured picture according to the decryption information to obtain a decrypted picture, and then utilizes a display device to display the decrypted picture;
- wherein the decryption information comprises at least one of a seed key, a mask picture, and a transposition table corresponding to the picture ID, the picture generating device re-arranges positions of multiple pixels of an original picture according to the transposition table to generate an intervening encryption picture, and then stacks the mask picture with the intervening encryption picture to generate the encrypted picture.

22. A computer program product, stored in a non-transitory computer readable medium, when executed by a processor module of a picture presenting device, enabling the picture presenting device to perform a picture viewing operation, wherein the picture presenting device comprises the processor module, a display device, a communication device, and an optical imaging device, the picture viewing operations comprising:

utilizing the optical imaging device to optically capture an image of a flat picture to generate a captured picture;

obtaining a picture ID corresponding to an encrypted picture;

utilizing the communication device to transmit the picture ID to a viewing control server via internet;

conducting an entity identification procedure with the viewing control server and obtaining a decryption information when passed the entity identification procedure, wherein the decryption information comprises at least one of a seed key, a mask picture, and a transposition table corresponding to the picture ID;

utilizing the processor module to process the captured picture according to the decryption information to obtain a decrypted picture; and utilizing the display device to display the decrypted picture;

wherein the operation of obtaining the decrypted picture comprises:

utilizing the processor module to re-arrange positions of multiple pixels of the captured picture according to the transposition table to obtain the decrypted picture.

23. The computer program product of claim 22, wherein the operation of obtaining the picture ID comprises:

conducting an optical character recognition on the captured picture to obtain the picture ID.

24. The computer program product of claim 22, wherein the operation of obtaining the picture ID comprises:

decoding the captured picture to obtain the picture ID.

25. The computer program product of claim 22, wherein the operation of obtaining the picture ID comprises:

utilizing the communication device to receive the picture ID through a wireless communication approach.

26. The computer program product of claim 22, wherein the picture viewing operation further comprises:

utilizing the optical imaging device to capture images of multiple different flat pictures to generate multiple captured pictures; and utilizing the processor module to respectively re-arrange positions of multiple pixels of the multiple captured pictures according to multiple different transposition tables to generate multiple different decrypted pictures;

wherein the multiple transposition tables are respectively corresponding to multiple picture IDs of the multiple flat pictures.

27. The computer program product of claim 22, wherein the operation of obtaining the decryption information comprises:

utilizing the communication device to receive the decryption information transmitted from the viewing control server via internet when passed the entity identification procedure.

28. The computer program product of claim 22, wherein the operation of conducting the entity identification procedure comprises:

utilizing the communication device to receive an encrypted decryption information transmitted from the viewing control server via internet; and utilizing the processor module to decrypt the encrypted decryption information and then to conduct the entity identification procedure.

29. A computer program product, stored in a non-transitory computer readable medium, when executed by a processor module of a picture presenting device, enabling the picture presenting device to perform a picture viewing operation, wherein the picture presenting device comprises the processor module, a display device, a communication device, and an optical imaging device, the picture viewing operations comprising:

utilizing the optical imaging device to optically capture an image of a flat picture to generate a captured picture;

obtaining a picture ID corresponding to an encrypted picture;

utilizing the communication device to transmit the picture ID to a viewing control server via internet;

conducting an entity identification procedure with the viewing control server and obtaining a decryption information when passed the entity identification procedure, wherein the decryption information comprises at least one of a seed key, a mask picture, and a transposition table corresponding to the picture ID;

utilizing the processor module to process the captured picture according to the decryption information to obtain a decrypted picture; and utilizing the display device to display the decrypted picture;

wherein the operation of obtaining the decrypted picture comprises:

utilizing the processor module to re-arrange positions of multiple pixels of the captured picture according to the transposition table to obtain an intervening decryption picture; and utilizing the processor module to stack the mask picture with the intervening decryption picture to obtain the decrypted picture.

30. A computer program product, stored in a non-transitory computer readable medium, when executed by a processor module of a picture presenting device, enabling the picture presenting device to perform a picture viewing operation, wherein the picture presenting device comprises the processor module, a display device, a communication device, and an optical imaging device, the picture viewing operations comprising:

utilizing the optical imaging device to optically capture an image of a flat picture to generate a captured picture;

obtaining a picture ID corresponding to an encrypted picture;

utilizing the communication device to transmit the picture ID to a viewing control server via internet;

conducting an entity identification procedure with the viewing control server and obtaining a decryption information when passed the entity identification procedure, wherein the decryption information comprises at least one of a seed key, a mask picture, and a transposition table corresponding to the picture ID;

utilizing the processor module to process the captured picture according to the decryption information to obtain a decrypted picture; and utilizing the display device to display the decrypted picture;

wherein the operation of obtaining the decrypted picture comprises:

utilizing the processor module to stack the mask picture with the captured picture to obtain an intervening decryption picture; and utilizing the processor module to re-arrange positions of multiple pixels of the intervening decryption picture according to the transposition table to obtain the decrypted picture.

* * * * *